United States Patent [19]

Markham et al.

[11] 4,273,439
[45] Jun. 16, 1981

[54] DOCUMENT FEEDER SYSTEM HAVING A SUSPENDING/COMMENCING MODE WITH A JUDGMENT DECISION CAPABILITY

[75] Inventors: Harvey R. Markham, Westminster; Roger D. Shepherd, Nederland, both of Colo.

[73] Assignee: International Business Machines Corporation, Armonk, N.Y.

[21] Appl. No.: 55,711

[22] Filed: Jul. 9, 1979

[51] Int. Cl.³ .......................................... G03G 15/00
[52] U.S. Cl. ................................ 355/14 C; 355/14 R
[58] Field of Search ................... 355/3 R, 14 R, 14 C, 355/14 SH

[56] References Cited

U.S. PATENT DOCUMENTS

| | | | |
|---|---|---|---|
| 3,561,754 | 2/1971 | Gaffron et al. | 270/58 |
| 3,744,790 | 7/1973 | Hoffman | 271/64 |
| 3,815,896 | 6/1974 | Hoyer | 271/4 |
| 3,825,338 | 7/1974 | Kolibas | 355/8 X |
| 3,936,180 | 2/1976 | Willard et al. | 355/14 R |
| 4,062,533 | 12/1977 | Greenberg et al. | 371/10 |
| 4,099,860 | 7/1978 | Connin | 355/14 |
| 4,192,607 | 3/1980 | Hage | 355/14 SH X |

OTHER PUBLICATIONS

A. H. Platt, "Apparatus for Selectively Copying From Two Different Documents," Research Disclosure, (No. 17366), Sep. 1978, pp. 61-64.

Primary Examiner—Fred L. Braun
Attorney, Agent, or Firm—John H. Holcomb

[57] ABSTRACT

A document feeder system, interfaced with a copier system, with, inter alia, a semi-automatic document feeder (SADF), an automatic document feeder (ADF), a prior task document judgment queue and an associated logic control system that allows the suspending of a prior task being run on either of the foregoing document feeders and the commencing of a subsequent or urgent task on any one of the other foregoing document feeders. This feeder suspending/commencing mode is carried out with a judgment decision capability based on judgment criteria consisting of the combination of certain predetermined prior and subsequent tasks information. Thus, when an urgent task operator selects a feeder suspending/commencing mode button, a single control panel is instantly made available so that the urgent task copy quantity and feature selections can be made. After the foregoing is accomplished, a judgment decision is made as whether to finish the copying of the original document on the document viewing glass and eject it into a prior task exit pocket and then enable the chosen urgent task feeder, or whether to feed the original document on the document viewing glass to the prior task document judgment queue for storage and subsequent feeding back onto the document viewing glass after the urgent task is completed. Whichever decision is made, the prior task status is retained for recall without having to reformat the single control panel. Accordingly, when the urgent task is completed, the urgent task operator de-selects the feeder suspending/commencing mode button thereby causing the copy quantity and feature selections of the prior task to be reentered into the single control panel and the re-commencing of the prior task without further operator intervention.

14 Claims, 13 Drawing Figures

FIG. 7A
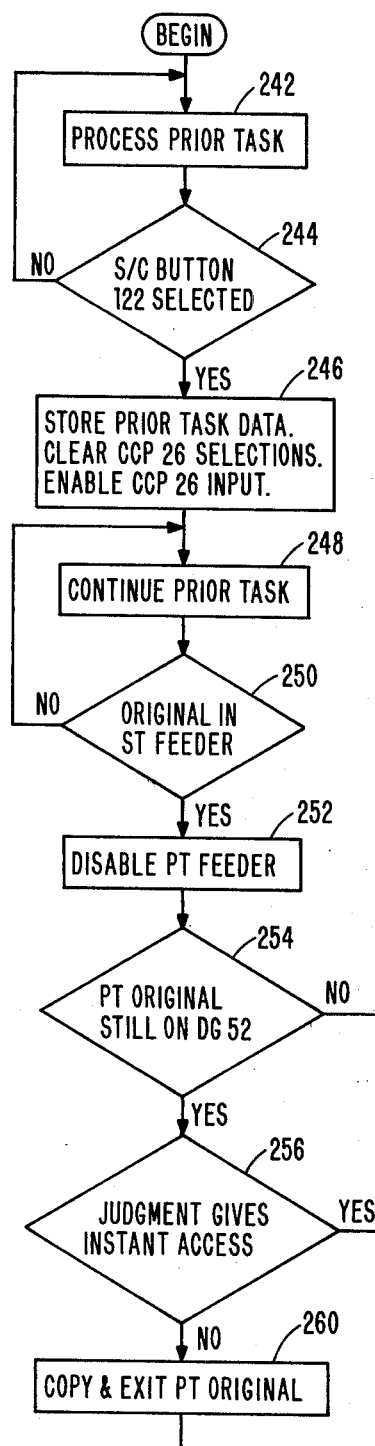
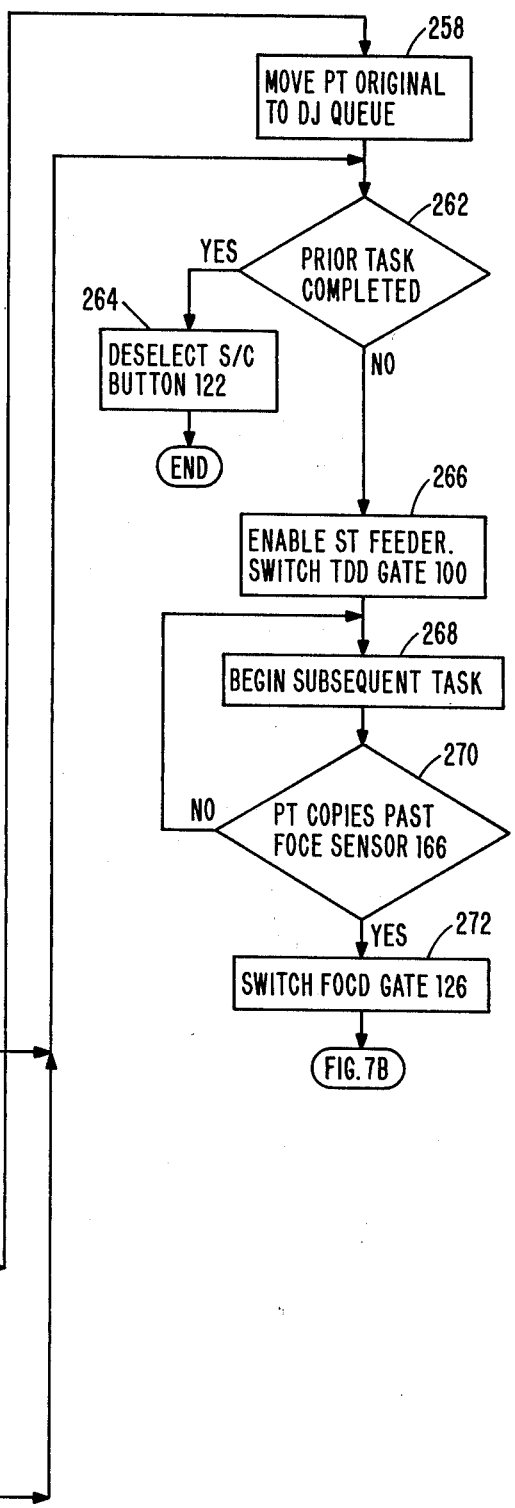

FIG. 8A

| FIG 7.A BLOCK # | VERBAL LANGUAGE |
|---|---|
| | BEGINSEGMENT (SUSPENDING/COMMENCING MODE) |
| 242 | REPEAT Process the prior task; |
| 244 | UNTIL Suspending/Commencing Button 122 is selected ENDREPEAT; |
| 246 | Store prior task data, such as feature selections and job status, in Copy Process RAM 200; |
| 246 | Clear prior task selections from Copy Control Panel 26; |
| 246 | Enable operator input of subsequent task selections on Copy Control Panel 26; |
| 248 | REPEAT Continue processing the prior task; |
| 250 | UNTIL The operator enters a subsequent task original document into the other feeder ENDREPEAT; |
| 252 | Disable further feeding of prior task original documents; |
| 254 | IF A prior task original is still on Document Glass 52 THEN |
| 256 |   IF Judgment criteria determine that the subsequent task should be given access to the copier immediately THEN |
| 258 |     Move the prior task original from Document Glass 52 to the Document Judgment Queue; ELSE |
| 260 |     Complete the copying of the prior task original on Document Glass 52 and exit it normally; ENDIF; ENDIF; |
| 262 | IF The prior task has now been completed THEN |
| 264 |   Deselect Suspending/Commencing Button 122 and start back at the beginning with the subsequent task now becoming the new prior task; ELSE |
| 266 |   Enable feeding of subsequent task original documents from the other feeder; |
| 266 |   Switch Task Directing Gate 100 in order to separate exited prior task original documents from exited subsequent task original documents; |
| 268 | REPEAT Begin processing the subsequent task; |
| 270 | UNTIL The last prior task copy sheet has passed First Output Copy Exit Sensor 166 ENDREPEAT; |
| 272 | Switch First Output Copy Directing Gate 126 in order to separate exited prior task copy sheets from exited subsequent task copy sheets; |

FIG. 8B

| FIG 7.B BLOCK # | VERBAL LANGUAGE |
|---|---|
| 274 | REPEAT Process the subsequent task; |
| 276 | UNTIL Suspending/Commencing Button 122 is deselected ENDREPEAT; |
| 278 | Disable operator input of subsequent task selections on Copy Control Panel 26; |
| 278 | Restore prior task data, such as feature selections and job status, from Copy Process RAM 200; |
| 280 | REPEAT Continue processing the subsequent task; |
| 282 | UNTIL No more subsequent task original documents have been entered by the operator ENDREPEAT; |
| 284 | Disable further feeding of subsequent task original documents; |
| 286 | IF A subsequent task original is still on Document Glass 52 THEN |
| 288 | Complete the copying of the subsequent task original on Document Glass 52 and exit it normally; ENDIF; |
| 290 | IF A prior task original was temporarily stored in the Document Judgment Queue THEN |
| 292 | Return the prior task original from the Document Judgment Queue to Document Glass 52; ENDIF; |
| 294 | Enable feeding of prior task original documents from the prior feeder; |
| 294 | Switch Task Directing Gate 100 in order to separate exited subsequent task original documents from exited prior task original documents; |
| 296 | REPEAT Resume processing the prior task; |
| 298 | UNTIL The last subsequent task copy sheet has passed First Output Copy Exit Sensor 166 ENDREPEAT; |
| 300 | Switch First Output Copy Directing Gate 126 in order to separate exited subsequent task copy sheets from exited prior task copy sheets; ENDIF; ENDSEGMENT (SUSPENDING\COMMENCING MODE); |

DOCUMENT FEEDER SYSTEM HAVING A SUSPENDING/COMMENCING MODE WITH A JUDGMENT DECISION CAPABILITY

CROSS-REFERENCES TO RELATED APPLICATIONS

Related applications assigned to the same assignee as the present invention are as follows:

U.S. patent application Ser. No. 768,651 to Andrews et al, entitled "Copy Production Machines," filed Feb. 14, 1977 and division U.S. Pat. No. 4,213,694, application Ser. No. 802,095 to Kuseski, filed May 31, 1977;

U.S. Pat. No. 4,203,585, application Ser. No. 926,979 to Kunz et al, entitled "Document Feed for a Copier Machine," filed July 21, 1978; and U.S. patent application Ser. No. 055,679 to Bach et al, entitled "Document Feeder System Having A Suspending/Commencing Mode," filed July 10, 1979.

BACKGROUND OF THE INVENTION

1. Field of the Invention

This invention relates to control of document feeder systems for use with copier systems generally, and more specifically to the control of at least two document feeders such that a prior task being run on either of the two document feeders will be suspended, with a judgment decision capability to allow a subsequent or urgent task to be run on the other one of the two document feeders, the judgment decision capability being based on judgment criteria consisting of the feature selections and copy quantity remaining to be processed of the prior task and the feature selections and copy quantity to be processed of the subsequent or urgent task.

2. Description of the Prior Art

Heretofore, various techniques have been advanced to improve the utility of electrophotographic copiers, duplicators, printers, card-handlers and like machines. One such technique has been to provide more than one input mode and/or device to the host machine so that each input mode and/or device corresponds and is dedicated to a specific predetermined job or task in the belief that, in this way, each task is handled in a more effective manner.

An important, but more general application, of the foregoing technique is disclosed in the previously cited related U.S. Application to Andrews et al. Andrews et al disclose a copy production machine having two input modes. The modes are print mode and copy mode.

In the print mode, word processing techniques, in conjunction with one of a plurality of imaging sources, operate such that original images generated thereby are automatically manipulated to produce a set of copies according to the original images. In the copy mode, electrophotographic copying techniques, in conjunction with a semi-automatic document feeder (SADF) device operates such that a specific number of copies of a single original document are produced at a time. In accordance with the teachings of Andrews et al, a print mode task can be "interrupted" to perform a copy mode task on the SADF. Also, in the print mode, one of the plurality of imaging sources can be selected on a priority basis. Thus, in Andrews et al the input modes and/or devices are dedicated to specific predetermined tasks in order to handle the tasks in a more effective manner with the additional capability of "interrupting" operations of the printing mode (primary) with the copy mode (secondary) using the SADF.

Consequently, there is a need in the prior art generally to provide more than one input device, in the form of document feeders, and, particularly to not limit the operation thereof to any dedicated and predetermined tasks.

A use of plural document feeders as input devices to an electrophotographic copier, having a measure of "interrupt" capability, is disclosed in the previously cited related U.S. Application to Kunz et al. The application to Kunz et al is cited for its value as background material rather than as prior art. With this notion in mind, Kunz et al disclose, in conjunction with an electrophotographic copier, an automatic document feeder (ADF) and a semi-automatic feeder (SADF) interfaced therewith. The ADF is a device, generally understood in its operation, for feeding from a stack of original documents, disposed in a tray thereof, one original document at a time, onto a document viewing glass whereupon a predetermined number of exposures of the original document are made as determined by the selected copy quantity. After these exposures are made, the original document is then fed to an exit area. The SADF is a device, generally understood in its operation, for feeding a single original document placed in its entry tray by an operator one at a time onto a document viewing glass. Thus, in Kunz et al, the ADF is situated directly above the aforementioned document viewing glass such that the feed path therefrom is around a 180° bend onto the document viewing glass. The SADF entry tray is situated adjacent the ADF and document viewing glass such that there is a direct feed path from the entry tray to the document viewing glass. Hence, although two document feeders, configured in a unique manner, are used in Kunz et al as input devices, they are limited in their operation in that each is dedicated to a predetermined task. Thus the mention of an "interrupt" capability is in conjunction with "interrupting" operation of the ADF running a large number of documents to run a small number of documents on the SADF. In this context, it would appear that the ADF is more effectively dedicated to tasks requiring a large number of copies and the SADF is dedicated to tasks requiring a small number of copies. However, there are situations, depending on the makeup of the task, where the SADF rather than the ADF should be the primary or desired feeder, e.g., 999 copies of a single original document. Moreover, while the foregoing task is being run, there are situations where a subsequent or urgent task is better run on the ADF (secondary feeder in this example). This subsequent task, for example, could consist of a stack of ten original documents with a requirement of one or two copies each. Quite clearly then, there is a need not only to handle tasks in a more effective manner by providing dual document feeders with "interrupt" capability only of the dedicated primary feeder by the dedicated secondary feeder, but a need to be able to "interrupt" operation of either the primary or secondary feeder, respectively, depending on the makeup of the tasks to be run.

Yet another "interrupt" technique using a single recirculating automatic document feeder (RADF) is disclosed in U.S. Pat. No. 4,099,860 to Connin, entitled "Copier/Duplicator Priority Interrupt Apparatus", filed Nov. 8, 1976, patented July 11, 1978, and assigned to Eastman Kodak Company. A RADF, as generally understood, (also termed "collating feeder") can operate in either a collate or noncollate mode to selectively produce collated or noncollated copies of original documents. However, its chief utility is in the collate mode since the need for a collator is eliminated. Herein lies the principal advantage of a RADF over an ADF.

In the collate mode, a stack of original documents, in sequential order from top to bottom, having been placed in the RADF, are fed therefrom singly from the bottom of the stack to a document viewing glass. After being exposed once, each original document is serially fed back in sequence to the top of the stack. This process is continued until all of the original documents are exposed once, thereby producing a single collated copy set. The process is repeated if more than one collated copy set is desired up to the number of sets selected.

In the noncollate mode the original documents are exposed more than once up to the number of copies selected by an operator. Of course, in this mode, a collator is needed to produce collated copy sets. In this mode of operation, then, there are no apparent advantages of a RADF over an ADF.

With the foregoing background in mind, the teachings of Connin are best understood by way of an example. Hence, in the collate mode, assume that there are 100 original documents in the stack and that a copy of the first original document is being made, i.e., the first original document is at the document viewing glass. Further, assume that an operator selects the "interrupt" mode at this point in time; however, the "interrupt" mode will not be acknowledged immediately. In fact, when the copy of the original document at the document viewing glass, i.e., the first original document is made, it is returned to the top of the stack and the next original document is fed to the document viewing glass and so on up to the 100th original document. Thus, the total set is completed, i.e., the copy of the 100th original document is made, before the "interrupt" mode is acknowledged, requiring a waiting period corresponding to 100 copies. This is a substantial time period.

Continuing with Connin, assume that in the noncollating mode as in the example above, there are 100 original documents in the stack, that the first original document has been fed to the document viewing glass and that the task requires 999 copies of each original document. Before each exposure, the system control checks to see if the "interrupt" mode has been selected and a decision is made to going into the "interrupt" mode. However, at this point, the "interrupt" mode is not acknowledged. In fact, it is not acknowledged until all of the 999 copies of the first document have been made requiring a waiting period corresponding to 999 copies. This is a prohibitive time period.

To sum up, in the collate mode, the "interrupt" mode can only be acknowledged after the making of a complete copy set at which point the "interrupt" will be acknowledged. In the noncollate mode, all copies of the original document at the document viewing glass will be made before the "interrupt" mode can be acknowledged. Moreover, in Connin a single document feeder is dedicated to two tasks which further limits the effectiveness of the "interrupt" mode as disclosed.

Accordingly, there is a need in the prior art in the situation of one or more input devices or modes operating in a collate or noncollate mode having "interrupt" capability to be able to immediately acknowledge an "interrupt" mode, in the case of a collate mode, before the completion of a copy set, and in the case of a noncollate mode, before the completion of the copying of the original document at the document viewing glass in order to increase copy throughput and enhance human factors. Additionally, there is a need to increase throughput but yet enhance operational human factors by eliminating the dedication of two tasks to a single feeder.

Still another "interrupt" technique or, better denoted as an "interleaving" technique, i.e., only alternate feeding, between a RADF and a document positioner (DP), is disclosed in publication 17361 to Hage, entitled "Apparatus for Selectively Copying From Two Different Document Feeders", *Research Disclosure,* September 1978 No. 173, pg. 61 et seq.

In Hage, a RADF having substantially the same structure as the feeder disclosed in Connin, is modified to include a DP which is suitable for feeding single original documents to a document viewing glass for copying one or more times, and then for ejecting the original documents from the document viewing glass along a non-recirculating path.

In addition, copies can be made either from the RADF or from the DP based on data furnished to a computer by an operator. In this mode of operation, the operator inputs appropriate data through only one of two control panels, a control panel being dedicated to each of the foregoing feeders, and places the original documents or document to be copied in the selected feeder. As disclosed, the RADF is dedicated to making collated sets of copies of an original document stack by recirculating each document once for each set desired, while the DP is dedicated to making noncollated copies of single original documents. However, as disclosed, if both feeders are used and formatted via their separate control panels, the DP can only process a single original document whereupon the RADF commences operation again. Then after an additional RADF feed cycle, the DP can process another original document and so on.

Herein lies the difference between what is understood to be an "interrupting" mode and an "interleaving" mode as disclosed in Hage. It should also be noted that in Hage, the DP has priority, i.e., it can delay operation of the RADF, a feed cycle at a time. Hence, if both feeders are loaded and both control panels are formatted, the DP feeds first. Nevertheless, after this first operation, there is no priority since feeding will be "interleaved" between the two feeders.

Hence, there is needed in the prior art not only to provide two document feeders so that original documents therefrom can be selectively copied, but to provide two document feeders not each dedicated to a particular task, to provide a true "interrupt" mode, in that a subsequent task regardless of its makeup or number of original documents can be continuously run on either of the two feeders, to provide means for "interrupting" either feeder, and to provide the foregoing by using only one control panel, thereby enhancing reliability, copy throughput and operational human factors and yet not limit task size or format.

The prior art and background, as indicated hereinabove, include some advances in the use of plural input modes and/or devices, and control of the modes or devices using "interrupting" and "interleaving" techniques to enhance operation of copier systems. However, no prior art system incorporates all of the features and advantages of the present invention.

OBJECTS OF THE INVENTION

Accordingly, an important object of the present invention is to immediately suspend operation of a first document feeder processing a prior task in order to commence operation of a second document feeder to process a subsequent or urgent task, whereupon the prior task is re-commenced with all the features and status thereof intact.

Yet another important object of the present invention is to suspend operation of either the first or second document feeder processing a prior task in order to commence operation of either the second or first document feeder to process a subsequent or urgent task, respectively, with a judgment decision capability.

Still another important object of the present invention is to eliminate the need for separate control panels for each document feeder and providing only one control panel thereby enhancing operational human factors and system reliability.

An important object of the present invention is to allow instant access to the one control panel and the electrophotographic copier system for making a subsequent task feature and copy quantity selections, regardless of which document feeder is operating for running the subsequent task without having to wait until the electrophotographic copier system clears the documents and copies of the prior task in progress, thereby enhancing subsequent task throughput, operational human factors and system reliability.

Yet another important object of the present invention is to provide a plural copy exit system including a plurality of collators and a plurality of exit pockets for receiving either the copies belonging to the prior or subsequent tasks so that copies of the subsequent task, depending on the feature selections and copy quantity remaining to be processed of the prior task and the feature selections and copy quantity to be processed of the subsequent task, are directed to any one of the remaining plurality of collator or exit pockets to separate the foregoing tasks from each other in the most convenient manner.

Still another important object of the present invention is to be able to suspend a prior task at any point in its progression.

Another important object of the present invention is to be able to suspend a prior task at any point in its progression with a judgment decision capability wherein judgment decision capability is based on judgment criteria consisting of the feature selections and copy quantity remaining to be processed of the prior task and the feature selections and copy quantity to be processed of a subsequent task to enhance throughput, operational human factors, and system reliability.

SUMMARY OF THE INVENTION

The plural document feeder system having a suspending/commencing mode according to the invention, by which these and other objects, features and advantages are accomplished is characterized, inter alia, by a prior task document judgment queue for storing original documents, for subsequent continued copying, fed from either one of two input devices designated herein as an automatic document feeder (ADF) and a semi-automatic document feeder (SADF). Although each of the foregoing feeders is configured to handle certain kinds of tasks more effectively than others, they are not dedicated to predetermined tasks. Moreover, the copy quantity of a task, along with the number of original documents therein, should be given substantial weight in any system employing an "interrupt" mode. Accordingly, since this fact is taken into account in the present invention and not in other known systems, the mode employed herein is termed suspending/commencing rather than "interrupt" to point out the above distinction. Other distinctions will become more apparent hereinafter.

Included in the plural document feeder system is a logic control system that is interfaced with an electrophotographic copier system having a plural copy exit system. The foregoing elements comprise a document reproduction system with all the inherent advantages attributable to the suspending/commencing mode with a judgment decision capability according to the invention. The judgment decision is a collective decision based on predetermined information of both the prior and subsequent tasks and is made available to the logic control system in order to enhance copy throughput, operational human factors and system reliability.

BRIEF DESCRIPTION OF THE DRAWINGS

The foregoing and other objects, features and advantages of the invention will be more apparent from the following more particular description of the preferred embodiment as illustrated in the accompanying drawings in which:

FIGS. 7A and 7B are segmented pictorial flowcharts of the suspending/commencing mode control segment of FIG. 6 according to the invention;

FIGS. 8A and 8B are segmented particular verbal flowcharts of the suspending/commencing mode control segment of FIG. 6 giving more specific information concerning the process and decision logic blocks of the segmented pictoral flowcharts of FIGS. 7A and 7B, respectively, according to the invention.

DESCRIPTION OF THE PREFERRED EMBODIMENT

Figure 1:
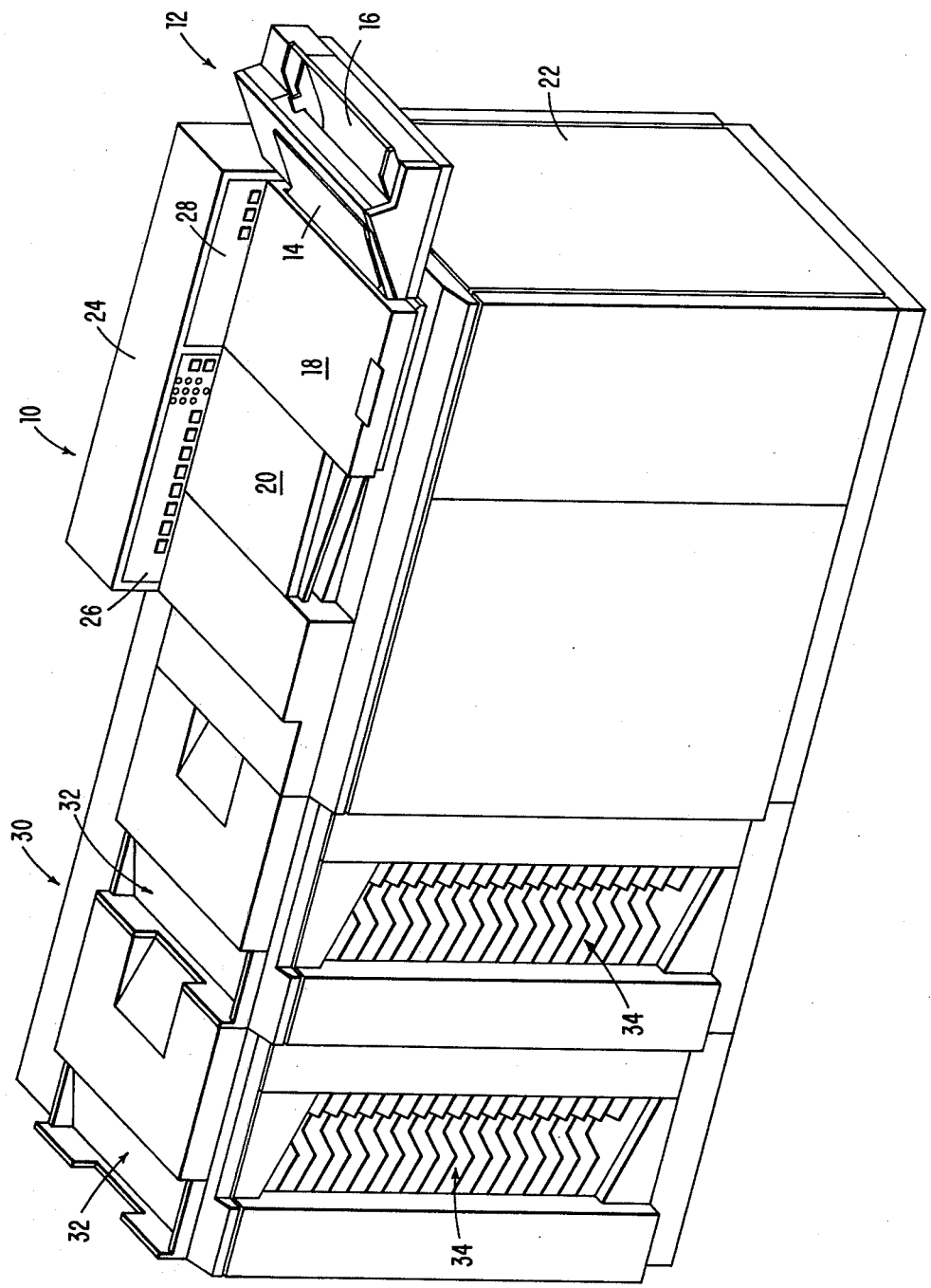
FIG. 1 is a perspective view of a document reproduction system including the present invention.

FIG. 1 shows a document reproduction system (DRS) 10 employing the present invention. It comprises a document feeder system (DFS) 12 including a semi-automatic document feeder (SADF) 14, an automatic document feeder (ADF) 16, a document feeder transport (DFT) 18 and a document feeder exit station (DFES) 20.

DFS 12 is operatively affixed and connected to an electrophotographic copier system 22 including a document reproduction system control tower 24, a copier control panel 26 and a document feeder control panel 28, all the foregoing being interfaced with DRS 10. Completing DRS 10, according to the invention, is plural copy exit system 30 including plural copy exit pockets 32 and plural copy collator/bins 34. Although DRS 10 of FIG. 1 depicts only two of the aforementioned plural copy exit pockets 32 and plural copy collator/bins 34, it is configured, as will be discussed hereinafter, to interface with additional ones thereof.

Figure 2:
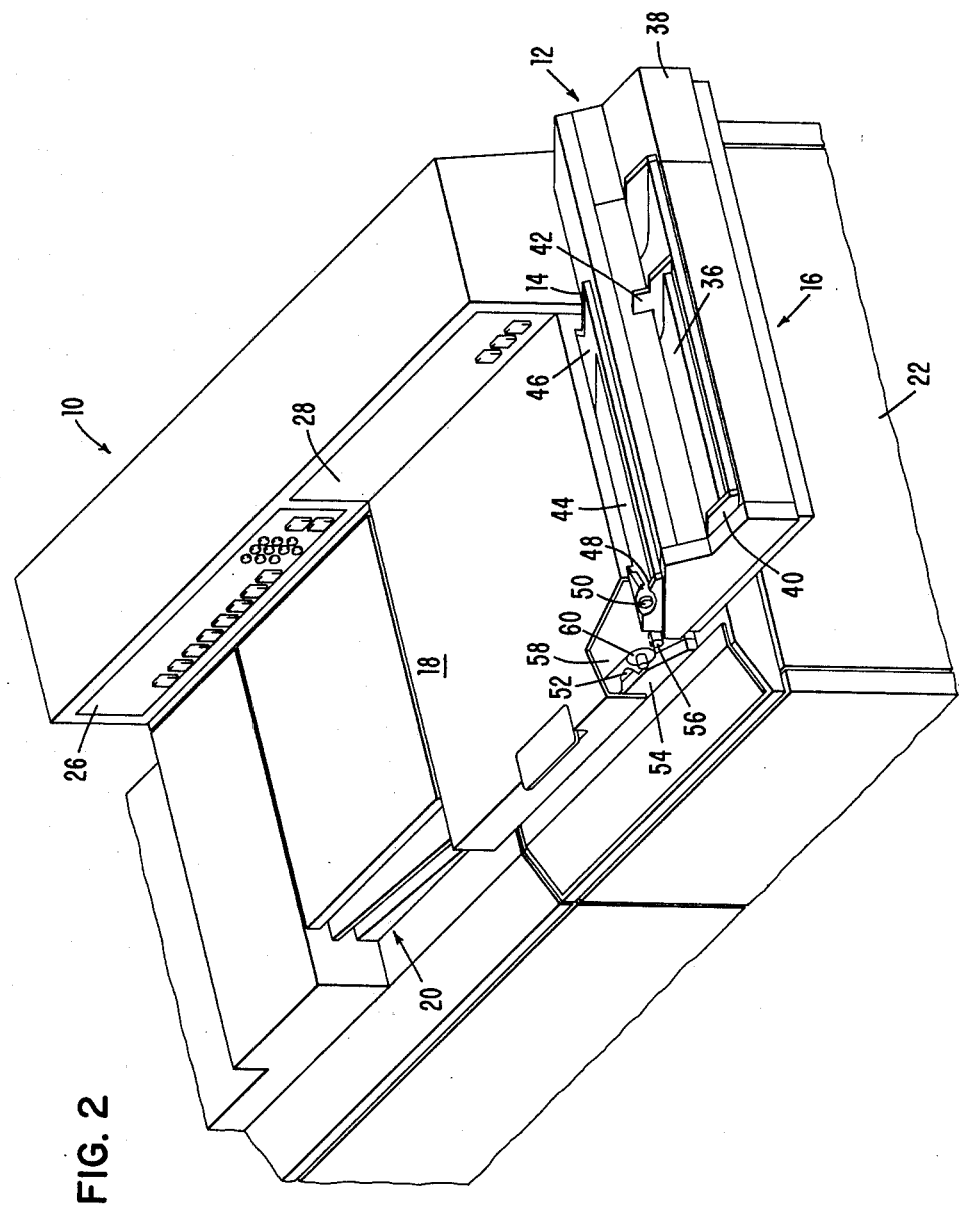
FIG. 2 is a perspective view of the plural document feeder system according to the invention.

Referring now, specifically, to the perspective view of the document feeder system 12 portion of DRS 10, as depicted in FIG. 2, an original document stack 36, for purposes of illustration, is shown disposed in ADF tray 38 being aligned against ADF front reference edge 40 by ADF adjustable rear reference edge 42.

Also, for purposes of illustration, a single original document 44 is shown disposed in SADF tray 46 being aligned against SADF front reference edge 48 by SADF front reference edge aligner roller 50. This roller, as depicted, is slightly skewed toward SADF front reference edge 48, such that when it is powered, single original document 44 is forced against the aforementioned front reference edge causing aligning thereof.

Still referring to FIG. 2, an original document from either ADF 16 or SADF 14 is fed to document viewing glass 52 and is imaged thereat by an imaging device (not shown) in electrophotographic copier system 22. It should be noted that the electrophotographic copying process and devices to accomplish same are well known in the prior art and, accordingly, form no part of the present invention. Continuing, for example, when single original document 44 is fed onto document viewing glass 52, it is forced against DFT front reference edge 54 by the combined actions of SADF front reference edge aligner roller 50, aforementioned, and a nip formed by DFT assist roller 56 and DFT continuous belt 58 being trained around DFT passive roller 60.

Figure 3A:
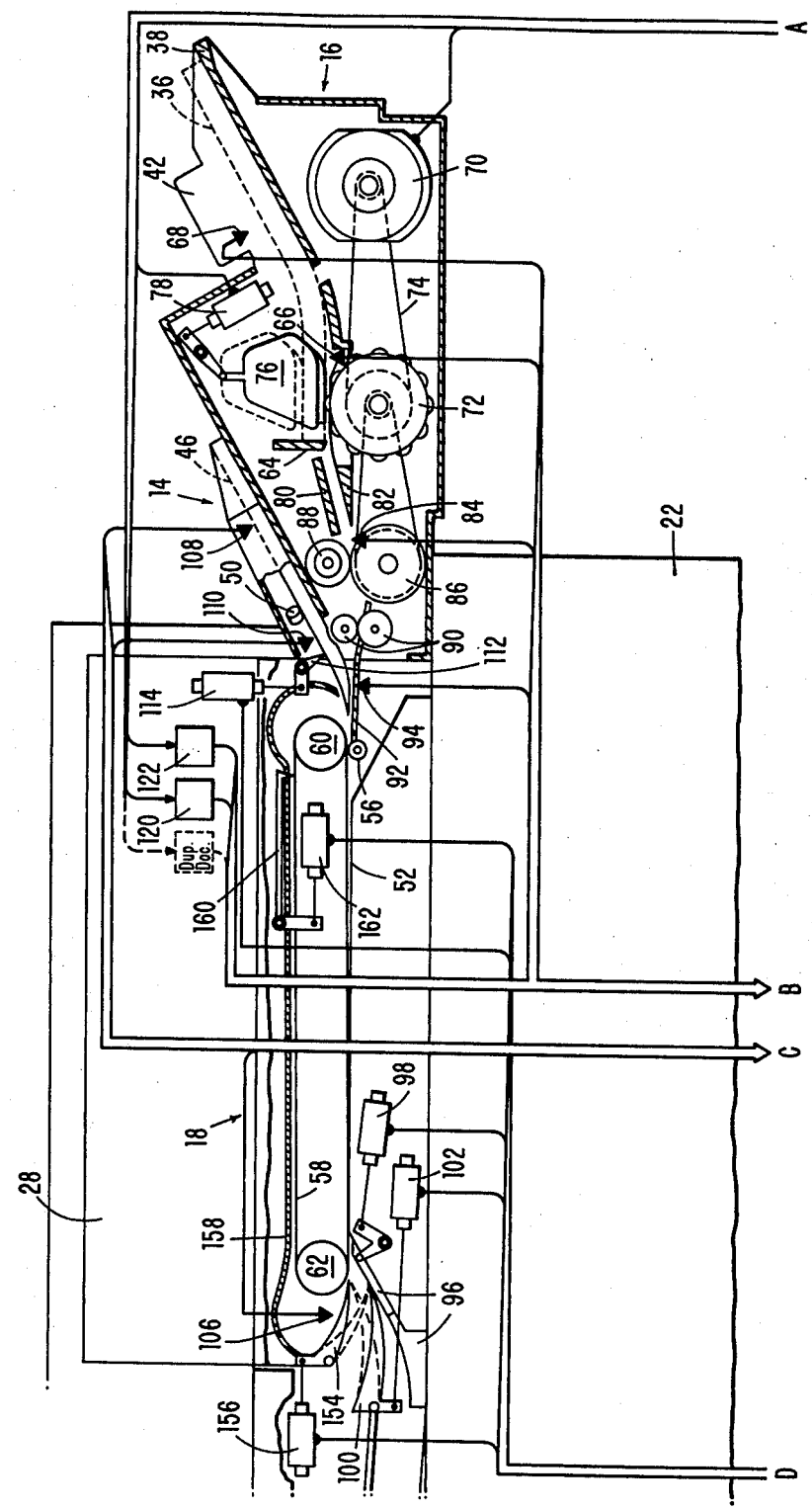
FIGS. 3A-3C are segmented partial pictorial side elevations of the plural document feeder system including the prior task document judgment queue, the copy exit system and associated sensors and controls depicting how signals are generated for inputs and outputs to the logic control system.
Figure 3B:
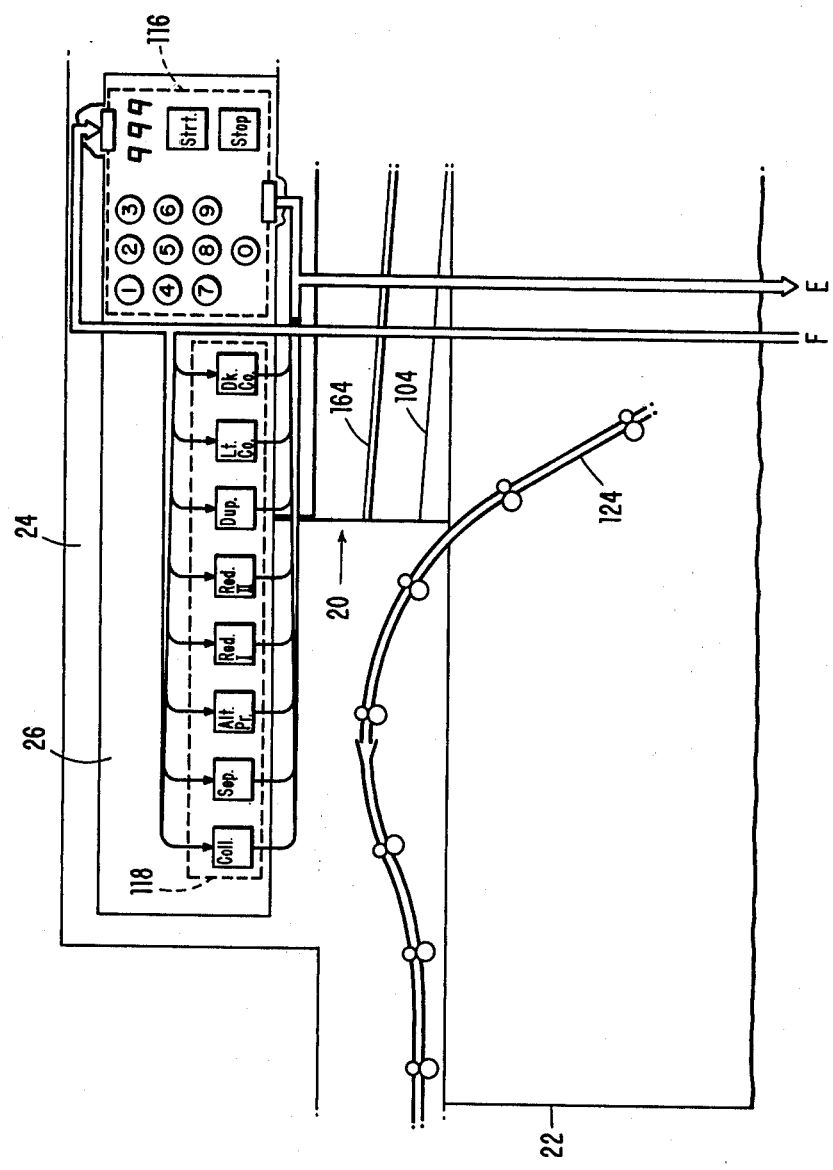
Figure 3C:
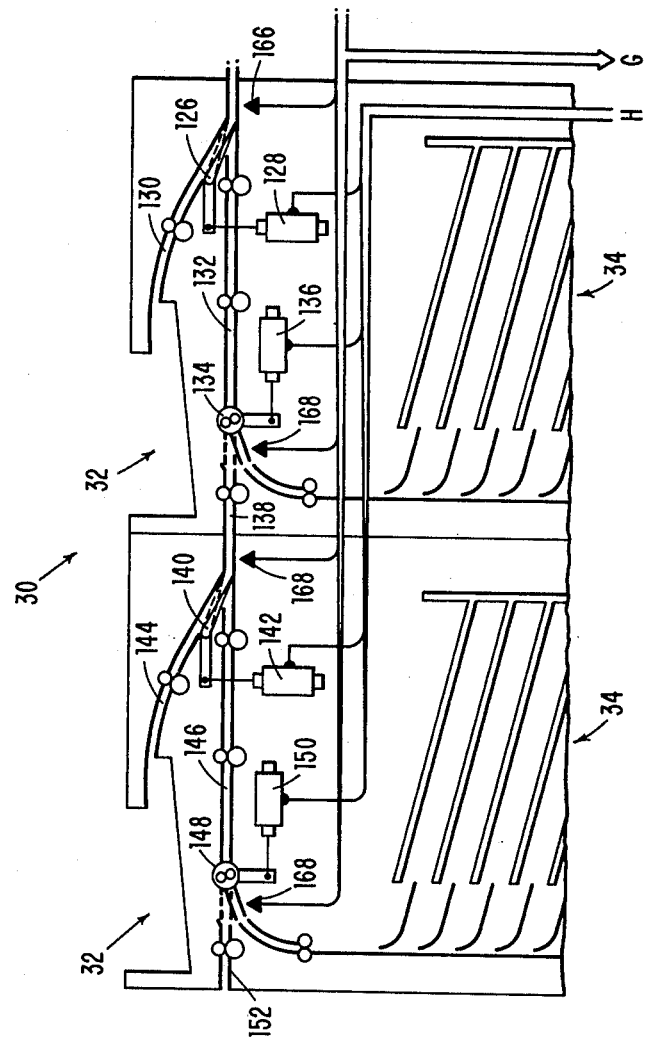

FIGS. 3A-3C in a segmented partial side elevational view, mainly for layout convenience, depict in greater detail, inter alia, document feeder system 12 including a prior task document judgement gueue (to be explained fully hereinafter), plural copy exit system 30 and various associated sensors and controls.

Referring then to FIGS. 3A-3C concurrently, DFT continuous belt 58 is also trained around and driven by DFT active roller 62 operatively connected to a motor and coupling (not shown). Original document stack 36 in ADF tray 38 is also aligned against ADF side reference edge 64. When original document stack 36 is placed in ADF tray 38 it is, as aforementioned, up against ADF front reference edge 40 (see FIG. 2). Thus, as depicted by its placement in FIG. 3A, ADF front reference edge sensor 66 determines whether original document stack 36 is properly against ADF front reference edge 40. Likewise, ADF rear reference edge sensor 68 determines whether ADF adjustable rear reference edge 42 is properly against original document stack 36. For purposes of the invention, these sensors and others to be described hereinafter, can be lever actuated microswitches or light emitting diodes in combination with phototransistors.

Sense signals from the aforementioned sensors are inputted onto ADF input bus B. As will be explained, a drive signal on ADF output bus A causes ADF motor 70 to operate. Accordingly, ADF motor 70 being operatively coupled to shingler wheel 72, by shingler wheel drive belt 74, causes operation thereof. In addition, normal force applicator 76, shown both in initially (phantom outline) and finally actuated (depends on height of original document stack 36) positions, is actuated by normal force applicator solenoid 78 against original document stack 36 causing documents therefrom to be shingled forward. The drive signal for normal force applicator solenoid 78 is also outputted from ADF output bus A.

The shingled documents (not shown) are guided by upper and lower shingled stack guide plates 80 and 82, respectively, and sensed by shingled stack depletion sensor 84 which also inputs a signal onto ADF input bus B. Original documents from the shingled stack are fed toward a nip formed by shingled stack separator roller 86 and shingled stack retard roller 88 which functions to separate a single original document from the shingled stack and feed this original document into separator assist roller pair 90. The feeding of this original document continues to be guided by document guide plate 92, and the leading and/or trailing edge thereof is sensed by ADF document leading/trailing edge sensor 94. This sensing signal is inputted onto ADF input bus B.

As previously mentioned, the nip formed by DET assist roller 56 and DFT continous belt 58 operates to feed the document onto document viewing glass 52 and against DFT exit/registration gate 96 for registration before imaging thereof.

In FIG. 3A DFT exit/registration gate 96 is shown in the exit or down position and in response to a signal from SADF output bus D, DFT exit/registration gate solenoid 98 is actuated causing DFT exit/registration gate 96 to pivot to the registration or up position. The aforementioned solenoid is actuated when either SADF 14 or ADF 16 (this example) is feeding original documents.

After imaging of the original document on document viewing glass 52, a signal from SADF output bus D causes DFT exit/registration gate solenoid 98 to deactivate into the exit or down position shown in FIG. 3A. Concurrently, task document directing gate 100, is actuated into the up position (shown in phantom outline) by task document directing gate solenoid 102 which is also actuated by a signal from SADF output bus D.

Consequently, the original document is fed into DFT exit station prior task document exit pocket 104 shown in FIG. 3B. DFT exit sensor 106 senses the exiting of this original document and in response thereto inputs a signal to SADF input bus C. This process continues until original document stack 36 is depleted, or until an operator selects the suspending/commencing mode, according to the invention, which is described in more detail in the "Statement of the Operation" hereintofollow.

When a single original document 44 is placed in SADF tray 46, it is sensed by SADF document sensor 108 which inputs a signal onto SADF input bus C. This causes SADF front reference edge aligner roller 50 to operate driving the original document into the vicinity of SADF document leading/trailing edge sensor 110 causing a signal therefrom to also be inputted onto SADF input bus C. The original document is also driven against SADF exit/registration gate 112 where it is in a ready position to be fed onto document viewing glass 52.

Then a signal from SADF output bus D actuates SADF exit/registration gate solenoid 114 causing SADF exit/registration gate 112 to open allowing the original document to be fed into the nip formed by DFT assist roller 56 and DET continuous belt 58, and then onto document viewing glass 52 against DFT exit/registration gate 96. The process is continued as previously described in conjunction with the feeding of an original document from ADF 16.

Still referring concurrently to FIGS. 3A–3C, but specifically to FIG. 3B, copy quantity select and display panel 116 is used to start and stop document reproduction system 10, to enter the desired number of copies per original document for either a prior or subsequent task being run or to be run on either SADF 14 or ADF 16, and to display this copy quantity. Likewise, copier feature selection buttons (collate, separate, alternate paper, reduction I, reduction II, duplex copies, light copy, dark copy) 118 are used to enter the features desired for either the prior or subsequent task being run or to be run on either of the aforementioned feeders. Signals to both copy quantity select and display panel 116 and copier feature selection buttons 118 are routed via copier control panel output bus F. Conversely, signals from both copy quantity select and display panel 116 and copier feature selection buttons 118 are routed via copier panel input bus E.

Disposed on DFS control panel 28, aforementioned, is DFS enable button 120 for enabling ADF 16, and suspend/commence button 122 for suspending or commencing operation of either SADF 14 or ADF 16, and to be discussed more fully in the "Statement of the Operation" hereintofollow. Signals to both DFS enable button 120 and suspend/commence button 122 are routed via ADF output bus A. Conversely, signals from both DFS enable button 120 and suspend/commence button 122 are routed via ADF input bus B. Although not part of the present invention, a duplex document button (shown in phantom outline) can be provided to operate in conjunction with the duplex copy button of copier feature selection buttons 118, aforementioned, to provide a duplex copy mode.

Referring still to FIG. 3B, but also to FIG. 3C, copies of original documents, after being made by electrophotographic copier system 22, for the prior or subsequent task, are fed into copy exit path 124 to first output copy directing gate 126 whereat, depending on whether first output copy directing gate solenoid 128 is deactuated or actuated, in response to signals from copy process output bus H, the copies are directed to the first one of plural copy exit pockets 32 via first output copy exit path 130, or to first output copy collator/bins path 132, respectively. Copies in first output copy collator/bins path 132 are fed to first output copy collator/bins directing gate 134 whereat, depending now on whether first output copy collator/bins directing gate solenoid 136 is deactuated or actuated, in response to signals from copy process output bus H, the copies are directed to first copy exit station interface path 138, or into the first one of plural copy collator/bins 34, respectively.

Likewise, for the embodiment depicted, and depending on feature selections and copy quantity for the prior or subsequent task, copies in first copy exit station interface path 138 are fed to second output copy directing gate 140 whereat, depending on whether second output copy directing gate solenoid 142 is deactuated or actuated, in response to signals from copy process output bus H, these copies are directed to the second one of plural copy exit pockets 32 via second output copy exit path 144, or to second output copy collator/bins path 146, respectively. Copies in second output copy collator/bins path 146 are then fed to second output copy directing gate 148 whereat, depending now on whether second output copy collator/bins directing gate solenoid 150 is deactuated or actuated, in response to signals from copy process output bus H, the copies are directed to second copy exit station interface path 152, or into the second one of plural copy collator/bins 34, respectively.

It should be noted that copies are directed to second copy exit station interface path 152 when the copy exit stations of plural copy exit system 30 number more than two. Accordingly, it should be clear that the configuration depicted in FIG. 3C is flexible and capable of extension depending on task requirements.

Referring again to FIG. 3A, if suspend/commence button 122 is pressed, then the suspending/commencing mode will be entered. In this case, if a prior task original document is on document viewing glass 52 being copied, then a judgement decision will be made, based on judgement criteria to be discussed hereinafter in the "Statement of the Operation," as to whether the original document on document viewing glass 52 will continue to be copied or whether it should be removed immediately in order to give access to the subsequent task. If the decision is that the original document should be removed immediately, DFT exit/registration gate 96 is lowered into the exit position and prior task document judgment queue entry gate 154 is lowered (as shown in phantom outline) by document judgment queue entry gate solenoid 156, in response to a signal from SADF output bus D, into a down position. Accordingly, DFT continuous belt 58 moves causing the original document to travel around DFT active roller 62 past DFT exit sensor 106, aforementioned, guided by prior task document judgment queue document guide 158 into the prior task document judgment queue or document storage area comprising, inter alia, the aforementioned belt 58 and guide 158. DFT exit sensor 106 senses the trailing edge of this original document and in response thereto inputs a signal to SADF input bus C which now causes prior task document judgment queue entry gate solenoid 156 to actuate in response to a signal from SADF output bus D causing prior task document judgment queue entry gate to be pivoted into the up or closed position as shown. The original document comes to rest against prior task document judgment queue exit gate 160 shown in a down position. When the original document is to be refed back onto document viewing glass 52 for recopying, prior task document judgment queue exit gate solenoid 162 is actuated by a signal from SADF output bus D causing the aforementioned exit gate 160 to raise allowing the original document to be fed around prior task document judgment queue document guide 158 back on to document viewing glass 52. While the subsequent task is being processed and the prior task original document is stored in the prior task document judgment queue, original documents from the subsequent task, after copying, are fed into DFT exit station subsequent task document exit pocket 164. This is accomplished by lowering task document directing gate 100 under the direction of task document directing gate solenoid 102, aforementioned. Accordingly, the prior task and subsequent task original documents are separated for operator convenience.

Referring again to FIG. 3C, first output copy exit sensor 166 detects an output copy from copy exit path 124 at first output copy directing gate 126. A plurality of other output copy exit sensors 168 perform a detection function at the other output copy directing gates. Signals from these sensors are inputted via copy process input bus G. Other copy process inputs originate from other sensors within electrophotographic copier system 22, e.g., copy paper path sensors, toner concentration density sensors, etc. Additional sensors at second copy exit station interface path (not shown) are similar to the aforementioned other sensors 168 and are used when additional plural copy exit system 30 are added.

Figure 4:
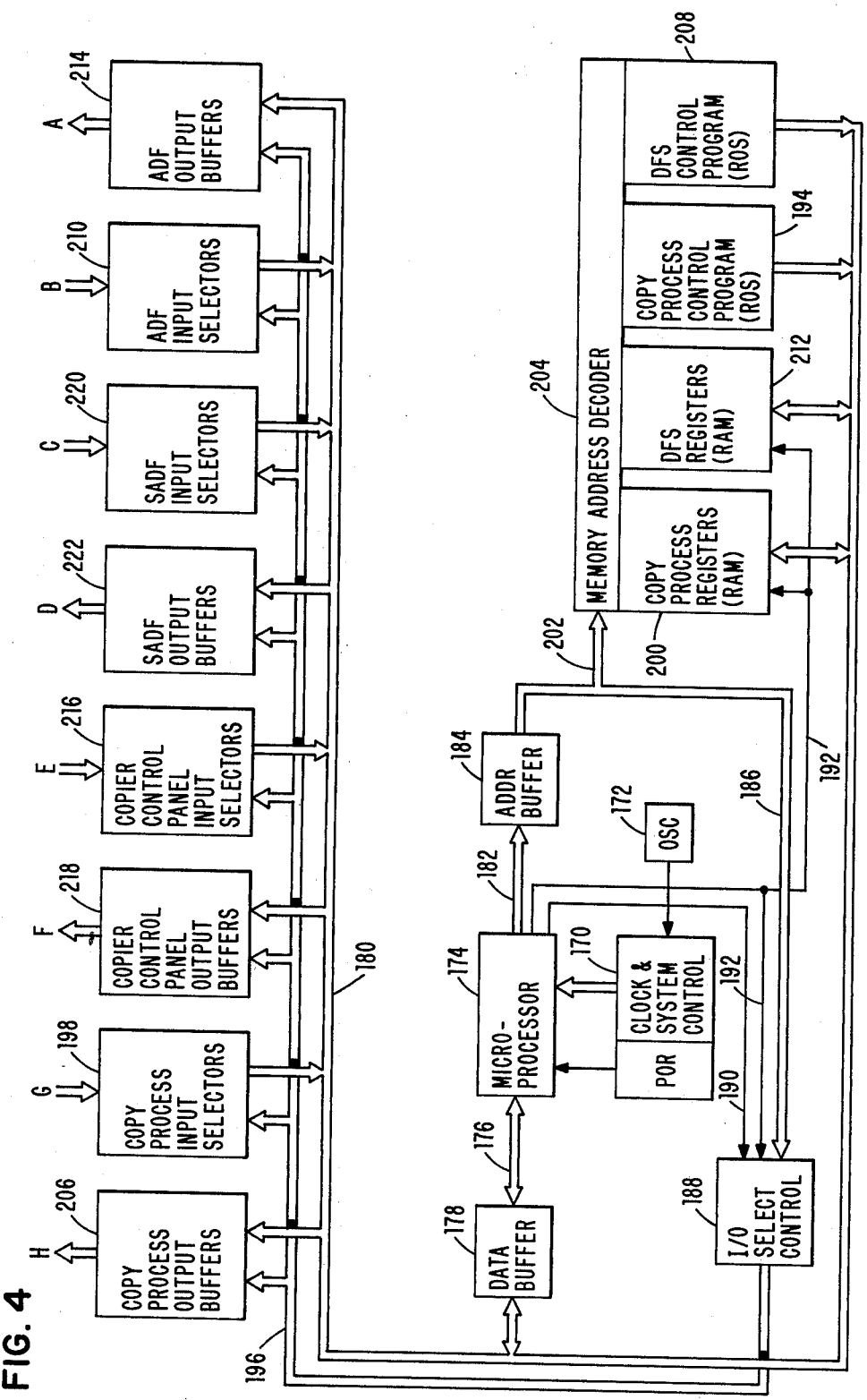
FIG. 4 is a block diagram representative of the logic control system according to the invention.

Referring now to the logic control system of FIG. 4, the power on reset (POR) portion of power on reset and system timing control 170 initializes the logic control system when power is first applied thereto. Likewise, the clock and system control portion of power on reset and system timing control 170, using timing pulses from system oscillator 172, generates the logic timing for the logic control system after initialization thereof.

The power on reset and system timing control 170 interfaces to microprocessor 174. For purposes of the invention, microprocessor 174 is a general purpose central processing unit (CPU) having an address range of 65 kilobytes, cycle time of approximately three microseconds, bidirectional 8-bit input/output data interface bus and performs both 8-bit and 16-bit data operations. For example, a microprocessor that can be used in the invention is the IBM OPMINI Microprocessor described fully in U.S. Pat. No. 4,086,658 to Finlay, filed Oct. 4, 1976, entitled "Input/Output and Diagnostic Arrangements For Programmable Machine Controllers Having Multiprogramming Capabilities," and assigned to the same assignee as this application. Other microprocessors that can be used in the invention are the INTEL 8080 and the Motorola 6800.

Microprocessor 174 transmits and receives data with the other portions of the logic control system of FIG. 4 through microprocessor input/output data bus 176. Microprocessor input/output data bus 176 is operatively connected to input/output data buffer 178. Data buffer 178 latches data from microprocessor input/output data bus 176 and outputs this data to system input/output data bus 180. The converse is also true.

In addition, microprocessor 174 transmits addresses to the other portions of the logic control system of FIG. 4 through microprocessor address bus 182. Microprocessor address bus 182 is operatively connected to address buffer 184. Address buffer 184 latches addresses from microprocessor address bus 182 and outputs these addresses to input/output address bus 186. Input/output address bus 186 is also operatively connected to input/output select control 188.

Input/output select control 188 uses the addresses from input/output bus 186 along with other control information from microprocessor 174 on input/output select line 190 and read/write line 192 for controlling the input selectors and output buffers. These selectors and buffers connect the logic control system of FIG. 4 to document reproduction system 10, depicted generally in FIG. 1 and specifically in FIGS. 3A–3C, aforementioned. For purposes of the invention, the input selectors condition signals from reproduction system 10 and multiplex these signals onto system input/output data bus 180 under the control of input/output select control 188. For purposes of the invention, the output buffers latch and condition data from system input/output data bus 180 and then output the conditioned data to document reproduction system 10, aforementioned, under the control of input/output select control 188.

As an example, instructions from copy process control program (ROS) 194 direct microprocessor 174 to input data from copy process input bus G. Microprocessor 174 then directs input/output select control 188 to send control signals along input/output select control cable 196 to enable copy process input selectors 198. Then in response, data on system input/output data bus 180 from copy process input selectors 198 is stored in copy process registers (RAM) 200. The particular register in copy process registers (RAM) 200 in which the data is stored is selected from memory address decoder 204 from an address on memory address bus 202. In a reverse manner, data is outputted through copy process output buffers 206 onto copy process output bus H.

Still as an example and in a similar manner, instructions from DFS control program (ROS) 208 direct the inputting of data from ADF input bus B through ADF input selectors 210 to storage in a register of DFS registers (RAM) 212, and direct the outputting of data through ADF output buffers 214 to ADF output bus A. The inputting and output of data through copier control panel input selectors 216, copier control panel output buffers 218, SADF input selectors 220 and SADF output buffers 222 is also controlled in the foregoing manner.

Microprocessor 174 directs the operation of document reproduction system 10, aforementioned, by executing instructions in a predetermined sequence. These sequences of instructions constitute segments. Sequences of segments constitute modules and a collection of modules constitutes a program.

Figure 5:
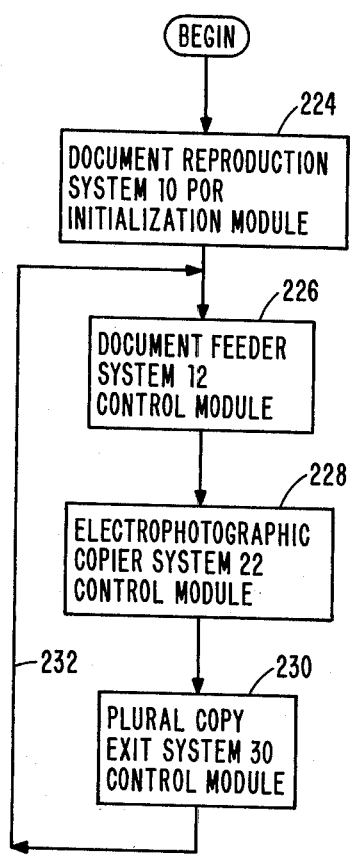
FIG. 5 is a general pictorial flowchart of the document reproduction system control program according to the invention.

FIG. 5 depicts a flow chart of document reproduction system 10 control program which is stored in copy process control program (ROS) 194 and DFS control program (ROS) 208. Immediately after power on, the control program begins at document reproduction system 10 POR initialization module 224. This module contains the sequence of instructions which controls initialization thereof. After initialization, document feeder system 12 control module 226, stored in DFS control program ROS 208, specifically, is executed. Electrophotographic copier system 22 control module 228 and plural copy exit system 30 control module 230 stored in copy process control program (ROS) 194, specifically, are then executed in sequence. Once these modules have completed execution, the program then loops back to document feeder system 12 control module 226 via polling loop 232. Portions of the aforementioned modules are executed, as necessary, in the loop as long as power is applied.

Figure 6:
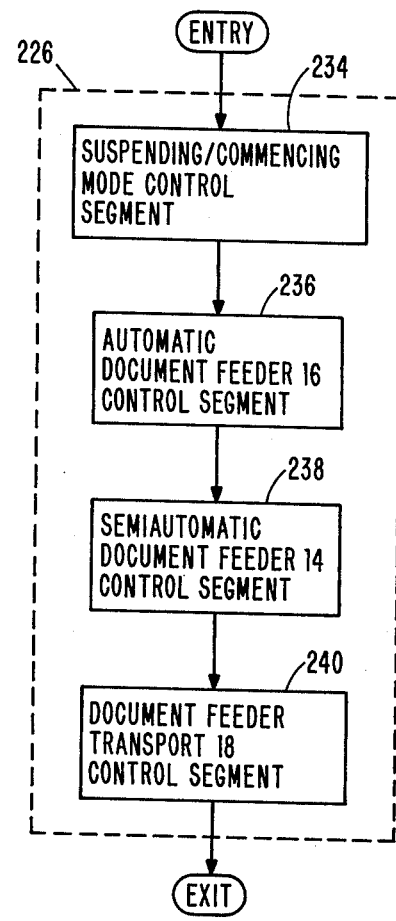
FIG. 6 is a specific pictorial flowchart of the document feeder system control module of FIG. 5 according to the invention.

In order to better understand the present invention, document feeder system 12 control module 226, stored in DFS control program (ROS) 208, is expanded in more detail in FIG. 6 to show the control segments thereof. Upon entry, the first segment executed is suspending/commencing mode control segment 234 which is the control sequence according to the invention. After execution of this segment, ADF 16 control segment 236, SADF 14 control segment 238 and document feeder transport 18 control segment 240 are executed in sequence.

STATEMENT OF THE OPERATION

Figure 7B:
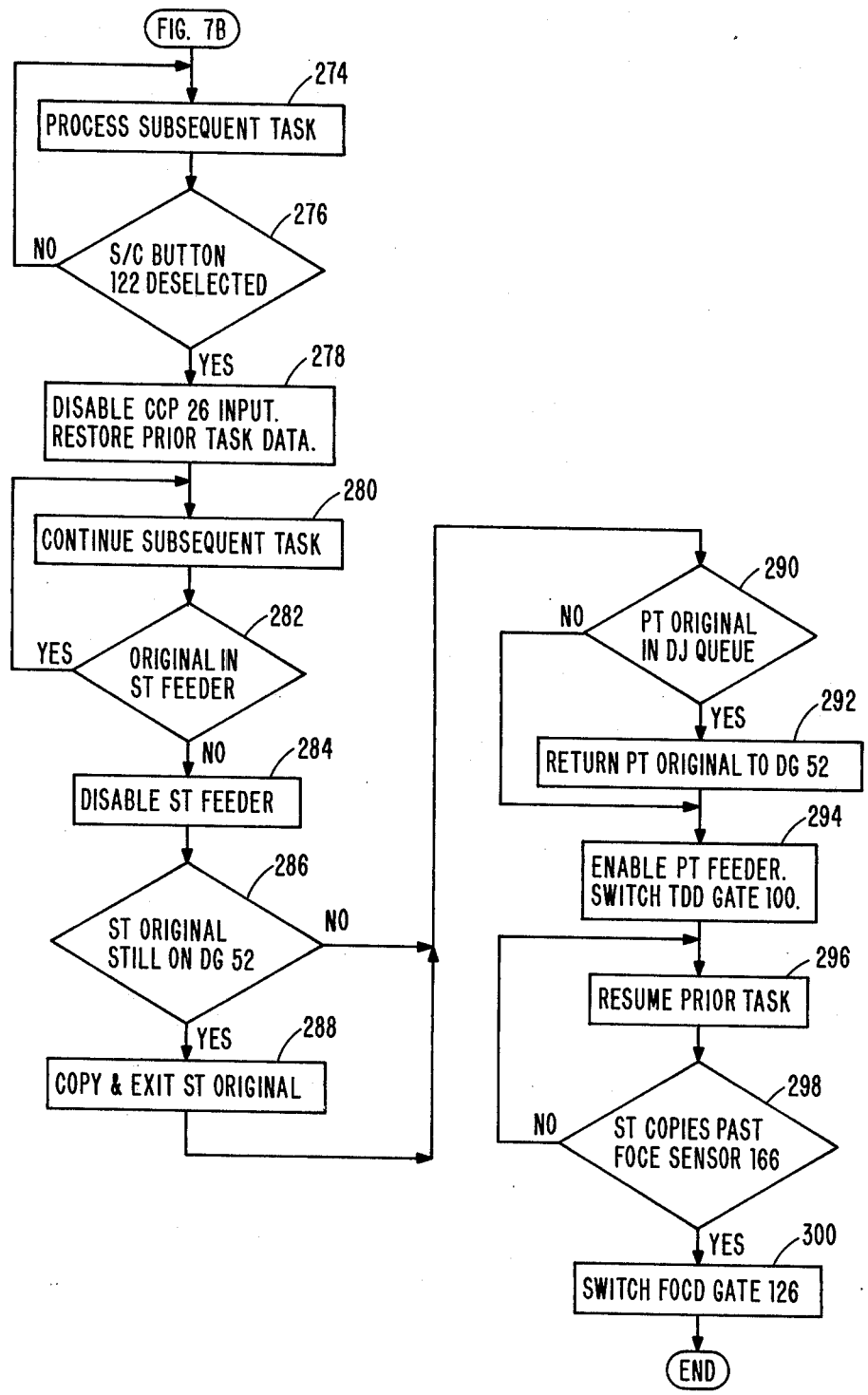
Figure 9:
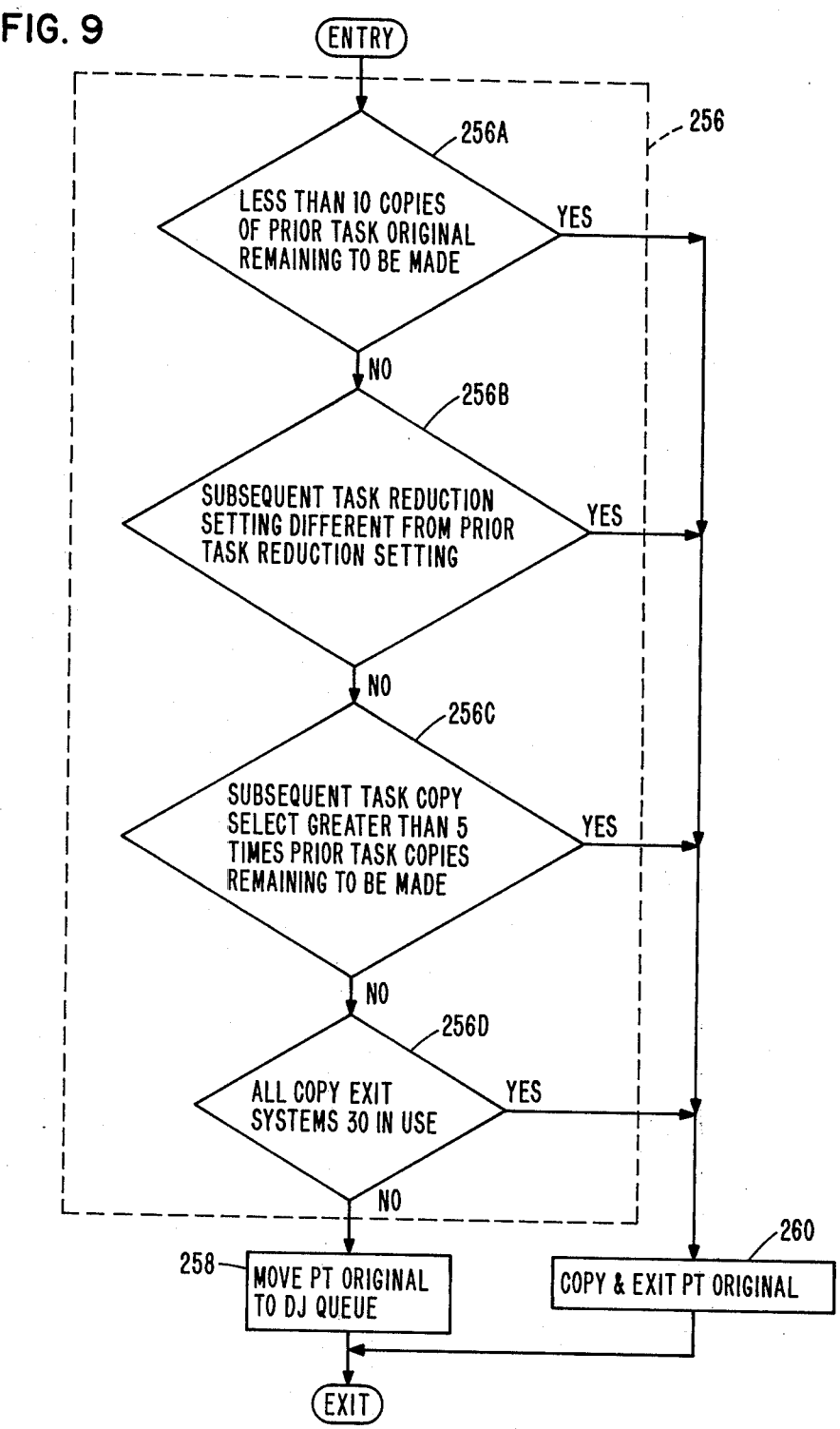
FIG. 9 is an expanded pictorial flowchart of decision block 256 of FIG. 7A showing specifically how judgment decisions are made and examples of the predetermined criteria used to make the decisions.

FIGS. 7A and 7B show in pictorial flowcharts, a more detailed representation of suspending/commencing mode control segment 234 previously described in FIG. 6. FIG. 7A, in particular, shows entry into the suspending/commencing mode, and FIG. 7B, in particular, shows exiting from the suspending/commencing mode. FIGS. 8A and 8B show verbal flowcharts of suspending/commencing mode control segment 234 giving a more detailed verbal description of the functions of the various process and decision blocks of the pictorial flowcharts of FIGS. 7A and 7B. FIG. 9 shows an expanded pictorial flowchart of decision block 256 of FIG. 7A, specifically depicting how judgment decisions are made and examples of the predetermined criteria used to make the decisions.

Referring now to FIGS. 7A and 8A concurrently, assume, for example, that a prior task is being run on either SADF 14 or ADF 16 of FIG. 1. Assume also for this example that the prior task copies are fed to the first plural copy exit system 30 of FIG. 1.

As the logic control system of FIG. 4 (hereinafter LCS) executes the prior task it stores prior task data such as feature selections and task status from copier control panel 26 in an area of copy process registers (RAM) 200. This data is temporarily stored for later retrieval. The LCS continues to process the prior task as denoted by process block 242 until an operator presses suspending/commencing button 122 of FIG. 3A. When the LCS senses that suspending/commencing button 122 has been selected, as denoted by decision block 244, then the temporarily stored prior task data is transferred to another area of copy process registers (RAM) 200 thus freeing up the previous area thereof for the subsequent task data. The LCS then causes the prior task feature selections and task status on copy control panel 26 to be cleared. This operation allows instant access to the operator to input the subsequent task feature and copy quantity selections on copy control panel 26 as denoted by process block 246.

Thus, single control panel 26 is freed up for subsequent task feature selections and copy quantity while copies of the prior task are still being processed in electrophotographic copier system 22 and original documents of the prior task are still on document viewing glass 52 being copied.

Consequently, the LCS continues to process the prior task as denoted by process block 248 while the operator is entering the subsequent task feature selections and copy quantity and is entering one or more subsequent task original documents into the other feeder. When the LCS senses that the operator has entered a subsequent task original document into the other feeder, as denoted by decision block 250, further feeding of the prior task original documents from the prior task feeder, as denoted by process block 252, is suspended. However, at this point in time a prior task original document is most likely still on document viewing glass 52 being copied. Accordingly, the LCS determines if a prior task original document is still on document viewing glass 52, as denoted by decision block 254. If a prior task original document is still on document viewing glass 52 then the LCS starts executing its judgment program examining various criteria to determine whether the subsequent task should be given access to electrophotographic copier system 22 immediately as denoted by decision block 256.

A principal advantage of the present invention, in its operation, is the capability of judgment decisions. The judgment concept embodied herein optimizes operator convenience and task throughput such that both the prior task and subsequent task are performed with reliability and enhanced operational human factors.

Referring then to FIG. 9, particular judgment criteria may vary depending on the configuration of the document reproduction system. One example of judgment criteria used herein is the number of copies remaining to be made of the prior task original document still on document viewing glass 52. If few copies remain to be made, then it is better to allow these copies to be made and finish the original document on document viewing glass 52 rather than to suspend at this point. For example, as shown in decision block 256A of FIG. 9, if less than ten copies of the prior task original document on document viewing glass 52 still remain to be made (typically 0.8 seconds per copy), then the judgment decision is to complete the copying of the prior task original document, as denoted by process block 260, instead of suspending the prior task immediately, as denoted by process block 258.

Another judgment criteria used is the reduction settings between the prior task and the subsequent task. If the reduction settings differ, i.e., from reduction I to reduction II or visa versa, then some time is needed (typically 5 seconds) to change the reduction setting before processing the subsequent task and then changing back before continuing with the prior task. Consequently, it is better, in regards to task throughput, to continue processing the prior task. For example, as also shown in decision block 256B of FIG. 9, if the subsequent task reduction setting is different from the prior task reduction setting, e.g., prior task reduction I and subsequent task reduction II, then the judgment decision is to complete the copying of the prior task original document, as denoted by process block 260, instead of suspending the prior task immediately, as denoted by process block 258.

Still another judgment criteria used is the number of copies per original document the operator has selected for the subsequent task. If the operator has selected a large number of copies, then it is better, in regards to task throughput, to continue processing the prior task. Still for example, as shown in decision block 256C of FIG. 9, if the subsequent task copy quantity selection is five times greater than the copies remaining to be made of the prior task original document on document viewing glass 52, then the judgment decision is to complete the copying of the prior task original document, as denoted by process block 260, instead of suspending the prior task immediately, as denoted by process block 258.

Yet another judgment criteria used is whether there is a conflict between the selection of the collator or exit pocket of plural copy exit system 30 for the prior task and subsequent task. If so, a judgment decision is made as to when to allow the subsequent task to begin processing so as to minimize the conflict as to where the output copies are to be fed. Preferably where there are plural copy exit systems 30, the prior task will not be using all of the available collator/bins and/or exit pockets so that copies of the subsequent task can be directed to one of the other collator/bins and/or exit pockets based on the subsequent task feature selections and copy quantity. However, for example, as shown in decision block 256D of FIG. 9, if all plural copy exit systems 30 are in use, then the judgment decision is to complete the copying of the prior task original document, as denoted by process block 260, instead of suspending the prior task immediately, as denoted by process block 258.

Referring again to FIGS. 7A and 8A concurrently, if the judgment decision, based on the foregoing criteria is that the prior task should be suspended immediately, then the LCS causes the prior task original document on document viewing glass 52 to be stored in the prior task document judgment queue, as denoted by process block 258. On the other hand, if the judgment decision is that the prior task should not be suspended immediately, copying of the prior task original document on document viewing glass 52 is continued to completion, whereupon it will be exited into DFT exit station prior task document exit pocket 104 of FIG. 3B, as denoted by process block 260.

Consequently, the LCS decides whether the prior task has been fully completed or not, as denoted by decision block 262. If the original document on document viewing glass 52 has been completed, it could be the last original document of the prior task. In this case, there is no need to suspend the prior task since it has been completed. Accordingly, if the LCS makes this determination, then it causes suspending/commencing button 122 to be deselected as denoted by process block 264. Any subsequent task which the operator had entered will now become the new prior task. This new prior task can now be suspended by a subsequent task as previously described. On the other hand, if the prior task has not been completed, the LCS executes as denoted by process block 266 thereby enabling the feeding of subsequent task original documents from the other feeder and allowing that feeder to start entering original documents onto document viewing glass 52 for copying. The LCS also causes task document directing gate 100 to switch in order to separate the exited prior task original documents from the exited subsequent task original documents. The subsequent task original documents are then directed to DFT exit station subsequent task document exit pocket 164. The dual original exit pockets 104 and 164, respectively, designated for prior task originals and subsequent task originals is a convenience feature incorporated in the LCS according to the invention. (See FIGS. 3A–3B).

Still referring to FIGS. 7A and 8A concurrently, the LCS now begins processing the subsequent task as denoted by process block 268 and causes the makings of copies of the subsequent task original document currently on document viewing glass 52. It should be noted, that copies of the prior task are still in copy exit path 124 at this point in time. Thus, processing of the subsequent task is begun before these copies have fully exited, in order to maximize copy throughput by not losing time between suspending the prior task and commencing the subsequent task.

Continuing, the LCS causes first output copy exit sensor 166 of FIG. 3C to be monitored, as denoted by decision block 270, to determine when the last copy from the prior task has passed the aforementioned sensor and is on its way to the first one of plural copy exit system 30. The LCS then causes first output copy directing gate 126 to switch in order to separate the exited prior task copies from the exiting subsequent task copies which are being fed sequentially in copy exit path 124 as denoted by process block 272. In this manner the set of copies of the two tasks are separated, one set going to plural copy collator/bins 34 and one set going to plural copy exit pocket 32 of the first one of plural copy exit system 30 of FIG. 3C. It should be noted that with an additional plural copy exit system 30, if the operator so desires, output copies can be directed thereto rather than separating tasks between plural copy exit pockets 30 and plural copy collator/bins 34 of the first one of plural copy exit system 30.

The LCS, accordingly, monitors the aforementioned operation via a plurality of other copy exit sensors 168. This completes the entry into the suspending/commencing mode. The prior task has now been suspended, its copies are out of copy exit path 124. Additionally, the subsequent task has been commenced and its copies are currently in copy exit path 124. The LCS continues to process the subsequent task at this point.

The exiting of the suspending/commencing mode is depicted specifically in FIGS. 7B and 8B. Referring now to the foregoing figures concurrently, the LCS continues with the processing of the subsequent task, as denoted by process block 274, until the operator deselects suspending/commencing button 122. This button is monitored, and when the deselection is sensed, as denoted by decision block 276, the LCS causes disabling of the use by the subsequent task of copier control panel 26, as denoted by process block 278. The LCS also causes restoration of the prior task data from the alternate area of copy process registers (RAM9 200 to the main active area thereof. This prior task data is feature selections and task status information from the prior task. In this manner, the LCS causes single copier control panel 26, which had been used for the subsequent task feature selections and copy quantity, to be returned back to use for the prior task feature selections and copy quantity without operator intervention.

The LCS continues processing the subsequent task, as denoted by process block 280, until no more subsequent task original documents are entered, as denoted by decision block 282. Thus, any subsequent task original documents entered are still fed onto document glass viewing 52 and copied until the task is completed. Then the LCS causes disabling of further feeding of subsequent task original documents from the feeder being used therefor, as denoted by process block 284.

The LCS, as denoted by decision block 286, then determines if a subsequent task original document is still on document viewing glass 52. If there is, then the LCS causes the copying of this subsequent task original document to continue and to be completed. This original document will then be exited into DFT station subsequent task document exit pocket 164, as denoted by process block 288. When the last subsequent task original document has been exited, then the LCS checks if a prior task original document has been temporarily stored in the prior task document judgment queue, as denoted by decision block 290. If a prior task original document had been stored therein, then the LCS causes this prior task original document to be returned to document viewing glass 52, as denoted by process block 292, for re-commencing of the prior task. As denoted by process block 294, the LCS enables the feeding of the remaining prior task original documents from its feeder, and causes task document directing gate 100 to switch back to its former position. Accordingly, original documents, henceforth, are exited to DFT exit station prior task document exit pocket 104 in order to keep original documents from the subsequent task separated from the prior task original documents (See FIG. 3A).

Consequently, the LCS causes the re-commencing of the processing of the prior task, as denoted by process block 296, by causing copying of the prior task original document which is now back on document viewing glass 52. It should be noted, again, that there is an overlap situation where copies of the subsequent task are still in copy exit path 124 at the same time that copies of the prior task are being made and are present in sequence in copy exit path 124. Thus, again throughput is maximized by not losing any time between switching from the subsequent task back to the prior task. Next, the LCS monitors first output copy exit sensor 166 again in order to determine when the last subsequent task copy has passed this sensor, as denoted by decision block 298. When the LCS does sense that the last subsequent task copy has passed first output copy exit sensor 166, it causes first output copy directing gate 126 to switch in order to divert the prior task copies following in sequence to their proper copy exit pocket and/or collator/bins. In this manner, the exited subsequent task copies, and the exited prior task copies are separated into different areas of plural copy exit system 30, as denoted by process block 300. At this point, the subsequent task is completed, its copies are out of copy exit path 124, and its original documents are in its exit pocket 164. (See FIGS. 3B-3C).

While the present invention has been shown and described with reference to a preferred embodiment thereof, it will be appreciated by those skilled in the art that variations in form may be made therein without departing from the spirit and scope thereof.

What is claimed is:

1. In a document reproduction system, including a document feeder system, an electrophotographic copier system and a copy exit system, configured to suspend processing a prior task, commence processing a subsequent task and then, recommence processing said prior task, the improvement comprising:

means for entering a suspending/commencing mode;
 first document feeder means of said document feeder system for feeding original documents to a document viewing glass of said electrophotographic copier system for copying thereof;
 second document feeder means of said document feeder system for feeding original documents to a document viewing glass of said electrophotographic copier system for copying thereof;
 prior task document queue means of said document feeder system, operatively connected to said first and second document feeder means for storing an original document of said prior task during said suspending/commencing mode, and for refeeding said original document of said prior task back onto said document viewing glass of said electrophotographic copier system, after completion of said subsequent task for recommencing of said prior task; and
 logic control means operatively connected to and cooperating with said means for entering said suspending/commencing mode, said first document feeder means, said second document feeder means, said prior task document queue means and said electrophotographic copier system such that when said suspending/commencing mode is entered, operation of either said first or said second document feeder means processing said prior task is suspended based on a judgment decision, determined in accordance with predetermined criteria, whether to finish the copying of said original document of said prior task on said document viewing glass and then feed the first original document of said subsequent task onto said document viewing glass, or whether to immediately feed said original document of said prior task into said prior task document queue and then feed said first original document of said subsequent task onto said document viewing glass.

2. The reproduction system of claim 1 wherein said predetermined criteria that said judgment decision is based consists of prior task and/or subsequent task information available to said logic control means.

3. The reproduction system of claim 2 wherein said prior task and/or subsequent task information available to said logic control means comprises the feature selections and/or copy quantity remaining to be processed of said prior task and the feature selections and/or copy quantity to be processed of said subsequent task.

4. The reproduction system of claim 1 wherein said first document feeder means is configured to feed original documents, disposed, one at a time, in its original document tray, singly, to said document viewing glass of said electrophotographic copier system.

5. The reproduction system of claim 1 wherein said second document feeder means is configured to feed a stack of original documents, disposed in its original document tray, one at a time, to said document viewing glass of said electrophotographic copier system.

6. The reproduction system of claim 1 wherein said document feeder system further includes a prior task original document exit pocket and a subsequent task original document exit pocket such that, in cooperation with said logic control means and said electrophotographic copier system, prior task original documents and subsequent task original documents are directed to their respective exit pockets for separation thereof.

7. The reproduction system of claim 1 wherein said copy exit system includes one copy exit station, operatively connected to said electrophotographic copier system, said copy exit station comprising:

a collator having a plurality of bins for receiving either prior task copies or subsequent task copies;
 an exit pocket for receiving either prior task copies or subsequent task copies; and
 gate means, in cooperation with said logic control means and said electrophotographic copier system, operating such that when said prior task copies are directed to said collator, said subsequent task copies are directed to said exit pocket, and when said prior task copies are directed to said exit pocket, said subsequent task copies are directed to said collator, thereby separating said subsequent task copies from said prior task copies.

8. The reproduction system of claim 1 wherein said copy exit system includes a plurality of copy exit stations, one of said plurality of copy exit stations being operatively connected to said electrophotographic copier system and the others of said plurality of copy exit stations being operatively connected to each other, each of said plurality of copy exit stations comprising:

a collator having a plurality of bins for receiving either prior task copies or subsequent task copies;
 an exit pocket for receiving either prior task copies or subsequent task copies; and gate means, in cooperation with said logic control means and said electrophotographic copier system, operating such that when said prior task copies are directed to one of the collators of said plurality of copy exit stations, said subsequent task copies are directed to any one of the exit pockets of said plurality of copy exit stations, or to any of the remaining collators of said plurality of copy exit stations, and when said prior task copies are directed to one of the exit pockets of said plurality of copy exit stations, said subsequent task copies are directed to any one of the collators of said plurality of copy exit stations, or to any one of the remaining exit pockets of said plurality of copy exit stations, thereby separating said subsequent task copies from said prior task copies in the most convenient manner in response to the feature selections and/or copy quantity remaining to be processed of said prior task and the feature selections and/or copy quantity to be processed of said subsequent task.

9. The reproduction system of claim 8 wherein more than one of said plurality of copy exit stations are operatively connected to said electrophotographic copier system and the remainder thereof are operatively connected to each other.

10. The reproduction system of claim 1 including a single control panel, in cooperation with said means for entering said suspending/commencing mode, said logic control means and said electrophotographic copier system, such that instant access to said single control panel and said electrophotographic copier system is allowed for making subsequent task feature and copy quantity selections, regardless of whether said first or said second document feeder means is processing said prior task, and regardless of whether said electrophotographic copier system is still processing said prior task, so that said subsequent task can be processed in sequence immediately.

11. The reproduction system of claim 1 wherein the processing of copies of said subsequent task begins immediately while the copies of said prior task are still in the copy path of said electrophotographic copier system.

12. The reproduction system of claim 1 wherein said first and second document feeder means include a document transport means operatively connected thereto for feeding original documents from either said first or said second document feeder means to said document viewing glass of said electrophotographic copier system for copying thereof.

13. The reproduction system of claim 12 wherein said document transport means includes said prior task document queue means operatively connected thereto for storing an original document of said prior task during said suspending/commencing mode, and for re-feeding said original document of said prior task back onto said document viewing glass of said electrophotographic copier system, after completion of said subsequent task for re-commencing of said prior task.

14. The reproduction system of claim 1 wherein said logic control means causes said prior task, being processed on either one of said first or second document feeder means to be suspended, and causes said subsequent task, to be processed, on the other one of said first or second document feeder means to be commenced, whereupon after the completion of said subsequent task, said logic control means causes said prior task to be immediately re-commenced.

* * * * *